United States Patent
Kim et al.

(10) Patent No.: US 9,673,449 B2
(45) Date of Patent: Jun. 6, 2017

(54) SILICON SLURRY FOR ANODE ACTIVE MATERIALS AND CARBON-SILICON COMPLEX

(71) Applicant: OCI COMPANY LTD., Seoul (KR)

(72) Inventors: Yo-Seop Kim, Seongnam-si (KR); Eun-Hye Jeong, Seongnam-si (KR); Sung-Ho Jung, Seongnam-si (KR); Hyung-Rak Kim, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 326 days.

(21) Appl. No.: 14/334,043

(22) Filed: Jul. 17, 2014

(65) Prior Publication Data

US 2015/0044570 A1 Feb. 12, 2015

(30) Foreign Application Priority Data

Aug. 9, 2013 (KR) .................. 10-2013-0094559

(51) Int. Cl.

| | |
|---|---|
| *H01M 4/04* | (2006.01) |
| *H01M 4/134* | (2010.01) |
| *H01M 4/1395* | (2010.01) |
| *H01M 4/36* | (2006.01) |
| *H01M 4/38* | (2006.01) |
| *H01M 4/587* | (2010.01) |
| *H01M 4/13* | (2010.01) |

(52) U.S. Cl.
CPC ......... *H01M 4/386* (2013.01); *H01M 4/0471* (2013.01); *H01M 4/13* (2013.01); *H01M 4/364* (2013.01); *H01M 4/587* (2013.01); *H01M 4/0404* (2013.01)

(58) Field of Classification Search
CPC ...... H01M 4/386; H01M 4/364; H01M 4/587; H01M 4/0471; H01M 4/13
USPC ........................................ 429/218.1, 231.8
See application file for complete search history.

(56) References Cited

U.S. PATENT DOCUMENTS

2010/0285359 A1* 11/2010 Hwang ................ H01M 4/133
  429/219
2013/0084501 A1* 4/2013 Wakayama ......... H01M 4/1397
  429/231.8

(Continued)

FOREIGN PATENT DOCUMENTS

| CN | 101411007 A | 4/2009 |
|---|---|---|
| CN | 101773793 A | 7/2010 |
| CN | 102376944 A | 3/2012 |

(Continued)

OTHER PUBLICATIONS

Chinese Office Action issued on Feb. 29, 2016 in connection with the corresponding Chinese Patent Application No. 201410079821.9.

(Continued)

*Primary Examiner* — Sean P Cullen
(74) *Attorney, Agent, or Firm* — Hauptman Ham, LLP (57) ABSTRACT

Silicon slurry for anode active materials of secondary batteries is provided. The silicon slurry includes silicon particles and a dispersion medium. The silicon slurry satisfies dispersion conditions of $1 \leq D90/D50 \leq 2.5$ and $2 \text{ nm} < D50 < 180 \text{ nm}$, where D90 denotes an average diameter of the silicon particles at 90% of cumulative particle size distribution, and D50 denotes an average diameter of the silicon particles at 50% of cumulative particle size distribution.

17 Claims, 9 Drawing Sheets

(56) References Cited

U.S. PATENT DOCUMENTS

2013/0266865 A1* 10/2013 Kwon .................. H01M 4/386
                                                    429/220
2014/0106230 A1*  4/2014 Kim  .................. H01M 4/1395
                                                    429/231.8

FOREIGN PATENT DOCUMENTS

| CN | 102651476 A | 8/2012 |
|----|-------------|--------|
| JP | 2008210618 A | 9/2008 |
| JP | 2011233340 A | 11/2011 |
| JP | 2014532267 A | 12/2014 |
| KR | 1020040082876 A | 9/2004 |
| KR | 1020050007311 A | 1/2005 |

OTHER PUBLICATIONS

Japanese Notice of Allowance issued on Mar. 25, 2016 in connection with the corresponding Japanese Patent Application No. 2014-046972.
Korean Office Action for application No. 10-2013-0094559 dated Aug. 26, 2014, citing the above reference(s).

* cited by examiner

SILICON SLURRY FOR ANODE ACTIVE MATERIALS AND CARBON-SILICON COMPLEX

CROSS-REFERENCE TO RELATED APPLICATION

This application claims the priority of the Korean Patent Application No. 10-2013-0094559 filed on Aug. 9, 2013 in the Korean Intellectual Property Office, and all the benefits accruing therefrom under 35 U.S.C. §119, the contents of which are incorporated by reference in their entirety herein.

TECHNICAL FIELD

The present disclosure relates to silicon slurry for anode active materials and a carbon-silicon complex.

An anode material capable of realizing lithium secondary batteries having high capacity is used in batteries for IT devices and automobiles. Under this circumstance, silicon is noticeable anode material for the high-capacity lithium secondary batteries. For example, pure silicon is known to have a high theoretical capacity of 4200 mAh/g.

However, the inventor(s) has recognized that it is difficult for silicon to be commercialized due to deterioration of cycle properties as compared with those of carbon-based materials. This is because, when inorganic particles, such as silicon particles, are used as an anode active material for intercalating or de-intercalating lithium, conductivity between active materials is deteriorated or the anode active material is released from an anode current collector due to volume change of the anode active material during charge and discharge of a lithium secondary battery. That is because a volume of the inorganic particles, such as silicon particles, included in the anode active material, is expanded about 300% to about 400% by charging and intercalating lithium. In addition, the inorganic particles contract when lithium is de-intercalated during discharge. The lithium secondary battery suffers from rapid deterioration in lifespan due to possible electrical insulation caused by an empty space generated between the inorganic particles and the anode active material, during repeated charge and discharge. Thus, the inorganic particles have serious obstacles to be applied in lithium secondary batteries.

SUMMARY

In accordance with some embodiments, there is provided silicon slurry for anode active materials of secondary batteries, comprising silicon particles and a dispersion medium, wherein the silicon slurry satisfies dispersion conditions of 1≤D90/D50≤2.5 and 2 nm<D50<180 nm, where D90 denotes an average diameter of the silicon particles at 90% of cumulative particle size distribution, and D50 denotes an average diameter of the silicon particles at 50% of cumulative particle size distribution.

DETAILED DESCRIPTION

Silicon slurry for anode active materials and carbon-silicon complex will be described more fully hereinafter with reference to the accompanying drawings, in which some embodiments are shown. Advantages and features of some embodiments accomplishing the same are hereafter detailed with reference to the accompanying drawings. The silicon slurry and carbon-silicon complex are embodied in different forms and should not be construed as limited to the embodiments set forth herein. Rather, these embodiments are provided so that this disclosure will be thorough and complete, and will fully convey the scope of the silicon slurry and carbon-silicon complex to those skilled in the art.

Unless defined otherwise, all technical and scientific terms used herein have the same meaning as commonly understood by one of ordinary skill in the art to which this application belongs. It is noted that the use of any and all examples, or exemplary terms provided herein is intended merely to better illuminate the silicon slurry and carbon-silicon complex and is not a limitation on the scope of the silicon slurry and carbon-silicon complex unless otherwise specified. Further, unless defined otherwise, all terms defined in generally used dictionaries may not be overly interpreted.

The use of the terms "a" and "an" and "the" and similar referents in the context of describing the silicon slurry and carbon-silicon complex (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

A detailed description of the silicon slurry and carbon-silicon complex is hereafter presented with reference to the accompanying drawings.

According to some embodiments, silicon slurry for anode active materials of secondary batteries includes silicon (Si) particles and a dispersion medium, wherein, where D90 denotes an average diameter of the silicon particles at 90% of cumulative particle size distribution and D50 denotes an average diameter of the silicon particles at 50% of cumulative particle size distribution, the silicon slurry satisfies dispersion conditions of about 1≤D90/D50≤about 2.5 and about 2 nm<D50<about 180 nm. The above average diameters of the silicon particles are measured by using a particle size analyzer ELS-Z2 (manufactured by Otsuka Electronics Co., Ltd.).

The silicon slurry for anode active materials of secondary batteries has a small D50, and a uniform and narrow particle size distribution. A silicon-based anode active material for the secondary batteries prepared from the silicon slurry including silicon nanoparticles uniformly dispersed in the dispersion medium alleviates volume expansion during charge and discharge of the secondary batteries, thereby improving lifespan of the secondary batteries. In addition, the silicon-based anode active material exhibits excellent reproducibility.

According to some embodiments, an anode active material layer of a secondary battery is formed by coating a coating composition for forming the anode active material layer onto an anode current collector, and the coating composition for forming the anode active material layer is prepared by adding an anode active material. In addition, the silicon-based anode active material is generally added in form of a powder to the coating composition for forming the anode active material layer.

According to some embodiments, the silicon slurry for anode active materials of secondary batteries is added to the coating composition for forming the anode active material layer in a slurry state in which the silicon particles are uniformly dispersed in the dispersion medium. That is, the silicon slurry for anode active materials of secondary batteries is used in the slurry state in which the silicon particles are uniformly dispersed in the dispersion medium.

In these embodiments, since the silicon slurry for anode active materials of secondary batteries is used in the slurry state in which the silicon particles are uniformly dispersed in the dispersion medium, the silicon particles are not to be exposed to air unlike the case of one being used in a powder state, and thereby refraining the oxidation of silicon.

As a result, the silicon slurry for anode active materials of secondary batteries has excellent capacity in consideration of the amount of silicon used by improving distribution characteristics thereof, as well as by using silicon having high capacity as an anode active material for secondary batteries. In some embodiments, the secondary battery has a capacity of about 80% a theoretical capacity of silicon.

In some embodiments, the silicon slurry for anode active materials of secondary batteries includes about 0.1 wt % to about 30 wt % of the silicon particles. The silicon slurry satisfies the aforementioned dispersion conditions of about 1≤D90/D50≤about 2.5 and about 2 nm<D50<about 180 nm while including a large amount of the silicon particles. In addition, since the silicon slurry is used in a slurry state, the silicon slurry maintains a uniform dispersion state while including a large amount of the silicon particles and having a small average particle diameter.

To realize the silicon slurry satisfying the aforementioned dispersion conditions of about 1≤D90/D50≤about 2.5 and about 2 nm<D50<about 180 nm, various methods for improving dispersion are used. In some embodiments, to realize the silicon slurry using silicon powder having a relatively large average particle diameter, various methods are performed or applied in combination.

For examples of the ways to improve dispersion, adjusting the kind of dispersion medium, adding additives to the silicon slurry, ultrasonication of the silicon slurry and the like are used. For improving dispersion, various other methods known in the art are also applied alone or in combination.

In some embodiments, the silicon slurry has a silicon particle distribution of about 1≤D90/D50≤about 2.0 and about 2 nm<D50<about 160 nm by improving dispersion using the aforementioned methods.

In some embodiments, the silicon slurry has a silicon particle distribution of about 1≤D90/D50≤about 1.75 and about 2 nm<D50<about 120 nm by further improving dispersion.

In some embodiments, the dispersion medium includes at least one selected from the group consisting of N-methyl-2-pyrrolidone (NMP), tetrahydrofuran (THF), water, ethanol, methanol, cyclohexanol, cyclohexanone, methyl ethyl ketone, acetone, ethylene glycol, octyne, diethyl carbonate, dimethyl sulfoxide (DMSO), and mixtures thereof.

Using these dispersion mediums assists in uniform dispersion of the silicon slurry.

In some embodiments, the silicon slurry further includes additives in order to achieve uniform dispersion of the silicon particles. The additives includes at least one selected from the group consisting of polyacrylic acid, polyacrylate, polymethacrylic acid, polymethyl methacrylate, polyacryl amide, carboxymethyl cellulose, polyvinyl acetate, polymaleic acid, polyethylene glycol, polyvinyl resins, copolymers thereof, block copolymers including a block having high affinity for Si and a block having low affinity for Si, and mixtures thereof. The additives assist in suppression of agglomeration of the silicon particles.

In some embodiments, among the additives, the block copolymers form Si-block copolymer core-shell nanoparticles along with the silicon particles in the slurry. The Si-block copolymer core-shell nanoparticles include: a Si core; and a block copolymer shell, which includes a block having high affinity for Si and a block having low affinity for Si and forms a spherical micelle structure around the Si core.

The blocks having high affinity for Si are drawn toward a surface of the Si core by van der Waals interaction and the like. In these embodiments, the block having high affinity for Si includes polyacrylic acid, polyacrylate, polymethacrylic acid, polymethyl methacrylate, polyacryl amide, carboxymethyl cellulose, polyvinyl acetate, or polymaleic acid, without being limited thereto.

The blocks having low affinity for Si are drawn toward the outside of the Si core by van der Waals interaction and the like. In these embodiments, the block having low affinity for Si includes polystyrene, polyacrylonitrile, polyphenol, polyethylene glycol, polylauryl methacrylate, or polyvinyl difluoride, without being limited thereto.

The block copolymer shell is a polyacrylic acid-polystyrene block copolymer shell. In these embodiments, the polyacrylic acid has a number average molecular weight ($M_n$) from about 100 g/mol to about 100,000 g/mol, and the polystyrene has a number average molecular weight ($M_n$) from about 100 g/mol to about 100,000 g/mol, without being limited thereto.

In some embodiments, the additives are present in an amount of about 0.1 parts by weight to about 50 parts by weight based on 100 parts by weight of the silicon particles. Within this content range of the additives, the additives assist the silicon slurry for anode active materials of secondary batteries in realizing uniform dispersion characteristics.

To realize the aforementioned dispersion characteristics, the silicon slurry for an anode active material of a secondary battery is subjected to various treatments such as ultrasonication, fine milling, ball milling, three roll milling, stamp milling, eddy milling, homo mixing, planetary centrifugal mixing, homogenization, vibration shaker treatment, and the like.

In some embodiments, the silicon slurry is subjected to ultrasonication in order to realize uniform dispersion characteristics.

Ultrasonication may be performed in a batch manner in which the overall silicon slurry is subjected to ultrasonication, or in a continuous circulation manner in which part of the silicon slurry is continuously subjected to ultrasonication while circulating the silicon slurry.

In some embodiments, since an apparatus for performing ultrasonication generally has a tip. Thus, and the silicon particles are dispersed using ultrasonic energy generated from an end of the tip, and there is a limit in a contact area to which such ultrasonic energy is transferred. Therefore, if a large amount of the silicon slurry is subjected to ultrasonication, an ultrasonication efficiency of the ultrasonication is improved by performing ultrasonication by the continuous circulation process, in which part of the silicon slurry is continuously subjected to ultrasonication while circulating the silicon slurry, rather than in the batch manner. That is, a greater amount of the silicon slurry is subjected to ultrasonication through continuous circulation-type ultrasonication at the same electric power for the same period of time, in comparison with the case of the batch manner.

In some embodiments of process conditions, when the silicon slurry is subjected to ultrasonication in the batch manner, about 1000 ml or less of the silicon slurry is subjected to the ultrasonication for about 30 seconds to about 1 hour while an electric power of about 100 W to about 500 W is supplied.

In some embodiments of process conditions, when the silicon slurry is subjected to ultrasonication in the continuous circulation manner, about 3600 ml/hr of the silicon slurry is subjected to the ultrasonication for about 30 seconds to about 1 hour while an electric power of about 500 W is supplied.

In some embodiments of process conditions, ultrasonication is performed at about 10 kHz to about 100 kHz, without being limited thereto.

In some embodiments, although the silicon slurry for anode active materials of secondary batteries is prepared by mixing the silicon powder with the dispersion medium, when the silicon powder is dispersed in the dispersion medium, the silicon particles agglomerate and form clusters. That is, the silicon particles included in the slurry have an increased average particle diameter, and the slurry becomes slurry in which the silicon particles are not uniformly dispersed.

In some embodiments, as described above, the silicon slurry for anode active materials of secondary batteries provides distribution characteristics of about $1 \leq D90/D50 \leq$ about 2.5 and about 2 nm$<D50<$about 180 nm in the slurry using the silicon powder having a particle size from about 2 nm to about 200 nm, for example, by selecting a suitable type of dispersion medium, by adding the additives, or by performing an additional process for improvement of dispersion such as ultrasonication, or the like. That is, although the silicon powder having an average particle diameter from about 2 nm to about 200 nm, specifically from about 10 nm to about 150 nm, is used, it is possible to obtain silicon slurry for anode active materials of secondary batteries, which include the silicon powder uniformly dispersed in the dispersion medium.

Since the silicon slurry for anode active materials of secondary batteries allows the silicon powder to provide distribution characteristics of about $1 \leq D90/D50 \leq$ about 2.5 and about 2 nm$<D50<$about 180 nm, dispersion of the silicon powder is improved in the slurry, and silicon present in a slurry state in the silicon slurry is prevented from oxidation, where as silicon being exposed to air such as silicon powder is easily oxidized. In this way, when silicon is prevented from oxidation, the silicon slurry further improves capacity of secondary batteries with the same determined amount of silicon in the silicon slurry when applied to an anode active material. As a result, an anode active material prepared using the silicon slurry provides excellent electrical properties of secondary batteries.

Therefore, the silicon slurry for anode active materials of secondary batteries is usefully applied to anode active materials of secondary batteries.

As described above, the silicon slurry for anode active materials of secondary batteries allows more uniform dispersion of the silicon particles, thereby realizing excellent dispersion characteristics.

In some embodiments, the silicon slurry for anode active materials of secondary batteries has a silicon particle distribution of about $1 \leq D90/D50 \leq$ about 2.0 and about 2 nm$<D50<$about 160 nm.

In some embodiments, the silicon slurry for anode active materials of secondary batteries has a silicon particle distribution of about $1 \leq D90/D50 \leq$ about 1.75 and about 2 nm$<D50<$about 120 nm.

In some embodiments, a carbon-silicon complex prepared from a mixed composition, in which the silicon slurry is mixed with carbon, is provided. The carbon-silicon complex is used in preparation of a secondary battery, and used as an anode active material forming an anode of the secondary battery.

The silicon slurry providing the aforementioned dispersion characteristics is used in preparation of the carbon-silicon complex.

The mixed composition is prepared by adding carbon to the silicon slurry prepared as described above, and is subjected to heat treatment, followed by carbonization, thereby preparing the carbon-silicon complex.

In some embodiments, the carbon includes at least one selected from the group consisting of pitch, natural graphite, artificial graphite, soft carbon, hard carbon, graphene, carbon nanotubes, and mixtures thereof, without being limited thereto. In some embodiments, the carbon is pitch.

In some embodiments, the silicon is presented in an amount of about 0.5 parts by weight to about 30 parts by weight based on 100 parts by weight of carbon in the carbon-silicon complex.

When the carbon-silicon complex including carbon and silicon in this amount ratio is used as an anode active material of a secondary battery, the carbon-silicon complex allow the secondary battery not to suffer from excessive volume expansion due to silicon during charge and discharge while allowing the secondary battery to secure high capacity, thereby securing long lifespan of the secondary battery.

Hereinafter, some embodiments will be described in more detail with reference to some examples. However, it should be noted that these examples are provided for illustration only and are not to be construed in any way as limiting the application.

Example 1

A slurry including 10 wt % of silicon was prepared by mixing silicon powder having an average particle diameter of 50 nm with NMP, followed by ultrasonication at 20 kHz and 500 Watt for 30 minutes in a continuous circulation manner, thereby preparing silicon slurry satisfying dispersion conditions of $1 \leq D90/D50 \leq 2.5$ and $2$ nm$<D50<180$ nm.

Example 2

A slurry including 10 wt % of silicon was prepared by mixing silicon powder having an average particle diameter of 50 nm with NMP, and 10 parts by weight of a polyacrylic acid-polystyrene block copolymer was added to the slurry as an additive based on 100 parts by weight of the silicon powder. The prepared slurry was subjected to ultrasonication at 20 kHz and 500 W for 30 minutes in a continuous circulation manner, thereby preparing silicon slurry satisfying dispersion conditions of $1 \leq D90/D50 \leq 2.5$ and $2$ nm$<D50<180$ nm.

Example 3

Silicon slurry satisfying dispersion conditions of $1 \leq D90/D50 \leq 2.5$ and $2$ nm$<D50<180$ nm was prepared in the same manner as in Example 2 except that a polyacrylic acid-polyacrylonitrile block copolymer was used as an additive instead of the polyacrylic acid-polystyrene block copolymer.

Example 4

Silicon slurry satisfying dispersion conditions of $1 \leq D90/D50 \leq 2.5$ and $2$ nm$<D50<180$ nm was prepared in the same manner as in Example 2 except that polyacrylic acid was used as an additive instead of the polyacrylic acid-polystyrene block copolymer.

Example 5

A slurry including 10 wt % of silicon was prepared by mixing silicon powder having an average particle diameter of 50 nm with NMP, and 10 parts by weight of a polyacrylic acid-polystyrene block copolymer was added to the slurry as an additive based on 100 parts by weight of the silicon powder. The prepared slurry was subjected to ultrasonication at 20 kHz and 500 Watt for 45 minutes in a batch manner, thereby preparing silicon slurry satisfying dispersion conditions of $1 \leq D90/D50 \leq 2.5$ and $2$ nm$<D50<180$ nm.

Example 6

Silicon slurry satisfying dispersion conditions of $1 \leq D90/D50 \leq 2.5$ and $2$ nm$<D50<180$ nm was prepared in the same manner as in Example 2 except that polymaleic acid was used as an additive instead of the polyacrylic acid-polystyrene block copolymer.

Example 7

A pitch was mixed with the silicon slurry prepared in Example 2, followed by stirring the mixture for about 30 minutes, thereby preparing a mixed composition. Here, silicon was presented in an amount of 5 parts by weight based on 100 parts by weight of the pitch. NMP was evaporated at 125° C. under vacuum. Then, the mixed composition was carbonized at 1000° C. for 5 hours, thereby forming a silicon-carbon complex. The obtained silicon-carbon complex was subjected to ball milling at 200 rpm for 1 hour, followed by sorting, thereby obtaining powder which includes only particles selected to have a particle diameter from 20 μm to 50 μm.

Comparative Example 1

Silicon powder having an average particle diameter of 50 nm was mixed with a mixed solvent in which NMP and cyclohexanone were mixed in a weight ratio of 50:50, thereby preparing silicon slurry including 10 wt % of silicon.

Comparative Example 2

Silicon powder having an average particle diameter of 50 nm was mixed with a mixed solvent in which NMP and cyclohexanol were mixed in a weight ratio of 50:50, thereby preparing silicon slurry including 10 wt % of silicon.

Comparative Example 3

Silicon powder having an average particle diameter of 50 nm was mixed with a mixed solvent in which NMP and methyl ethyl ketone (MEK) were mixed in a weight ratio of 50:50, thereby preparing silicon slurry including 10 wt % of silicon.

Comparative Example 4

Silicon powder having an average particle diameter of 50 nm was mixed with a mixed solvent in which NMP and diethyl carbonate (DC) were mixed in a weight ratio of 50:50, thereby preparing silicon slurry including 10 wt % of silicon.

Comparative Example 5

Silicon powder having an average particle diameter of 50 nm was mixed with tetrahydrofuran (THF), thereby preparing silicon slurry including 10 wt % of silicon.

Comparative Example 6

Silicon slurry satisfying dispersion conditions represented in Table 2 was prepared in the same manner as in Example 2 except that an acrylic acid monomer was used as an additive instead of the polyacrylic acid-polystyrene block copolymer.

Experimental Example 1

Figure 1:
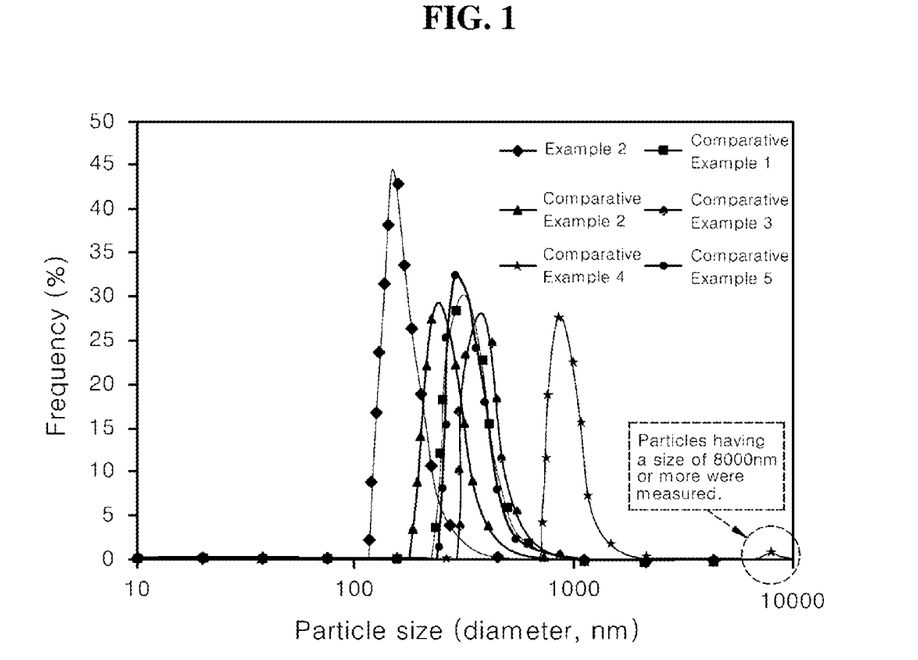
FIG. 1 is a graph showing silicon particle distributions of silicon slurries prepared in Example 2 and Comparative Examples 1 to 5, as measured by dynamic light scattering, according to some embodiments.
Figure 2:
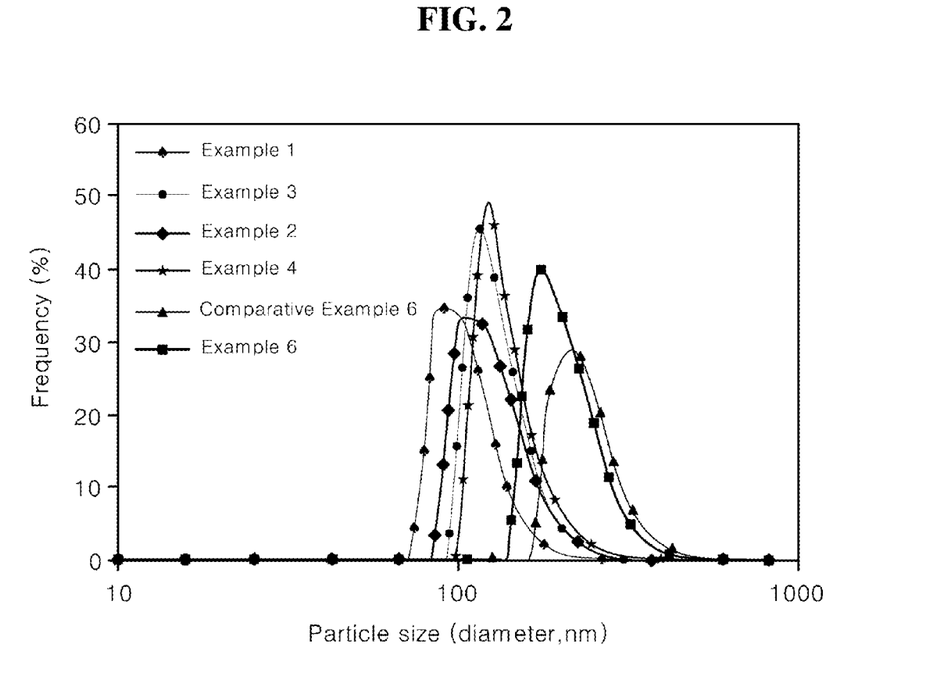
FIG. 2 is a graph showing silicon particle distributions of silicon slurries prepared in Examples 1 to 4 and 6 and Comparative Example 6, as measured by dynamic light scattering, according to some embodiments.

Distribution characteristics of silicon particles of the silicon slurries prepared in Examples 1 to 4 and 6 and Comparative Examples 1 to 6 by dynamic light scattering were measured using an ELS-Z2 (Otsuka Electronics Co., Ltd.). Results are shown in FIGS. 1 and 2, and values of D90/D50 and D50 corresponding to the results are shown in Tables 1 and 2.

TABLE 1

|  | Example 1 | Example 2 | Example 3 | Example 4 | Example 6 |
|---|---|---|---|---|---|
| Average particle size [nm] | 157.8 | 174.1 | 109.4 | 128.1 | 210.5 |
| D90/D50 | 1.41 | 1.40 | 1.30 | 1.42 | 1.4 |
| D50 [nm] | 132 | 148 | 92.8 | 110.2 | 178.8 |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Average particle size [nm] | 371.3 | 268.7 | 412.1 | 968.6 | 345.2 | 253.0 |
| D90/D50 | 1.37 | 1.36 | 1.33 | 1.31 | 1.37 | 1.38 |
| D50 [nm] | 301.2 | 241.5 | 364.6 | 873.3 | 302.8 | 211.3 |

In Examples 2 to 4, it shows that the silicon slurries satisfying the aforementioned dispersion characteristics were prepared using the polyacrylic acid-polystyrene block copolymer, the polyacrylic acid-polyacrylonitrile block copolymer and polyacrylic acid as the additives, respectively.

On the other hand, in Comparative Examples 1 to 6, the silicon slurries satisfying the aforementioned dispersion characteristics were not prepared.

Experimental Example 2

Figure 3:
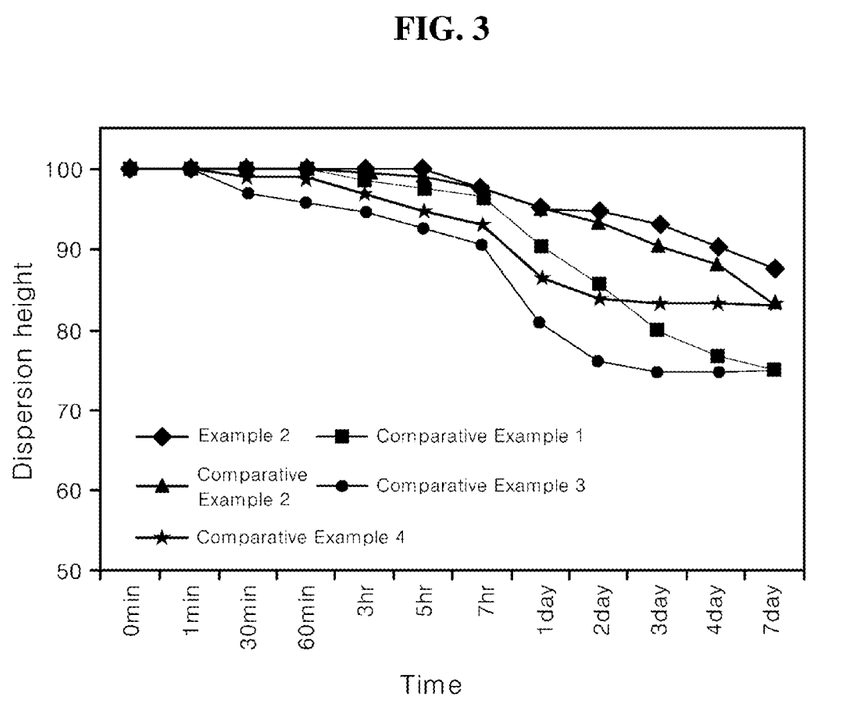
FIG. 3 is a graph showing heights of silicon slurries prepared in Example 2 and Comparative Examples 1 to 4 for the layer below the phase separation after leaving the same for a certain period of time, according to some embodiments.

To evaluate dispersion stability of the silicon slurries of Example 2 and Comparative Examples 1 to 4, the silicon slurries were left in a graduated cylinder, and then the silicon slurries were observed to determine whether layer separation occurred over time, and the height of the silicon slurry excluding a separated upper supernatant liquid layer was measured by % relative to an initial height of the silicon slurry. Results are shown in FIG. 3.

Figure 4A:
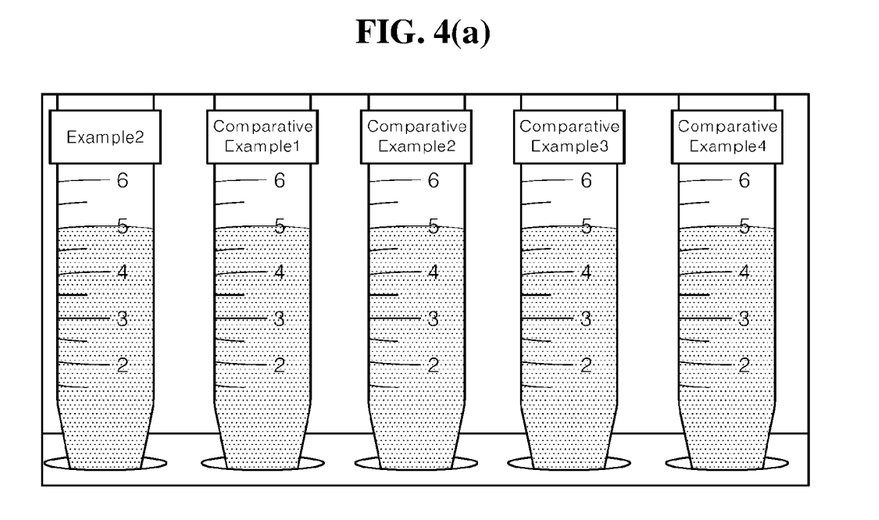
FIGS. 4(a) and 4(b) are pictures of silicon slurries prepared in Example 2 and Comparative Examples 1 to 4 before and after leaving the same for a certain period of time, respectively, according to some embodiments.
Figure 4B:
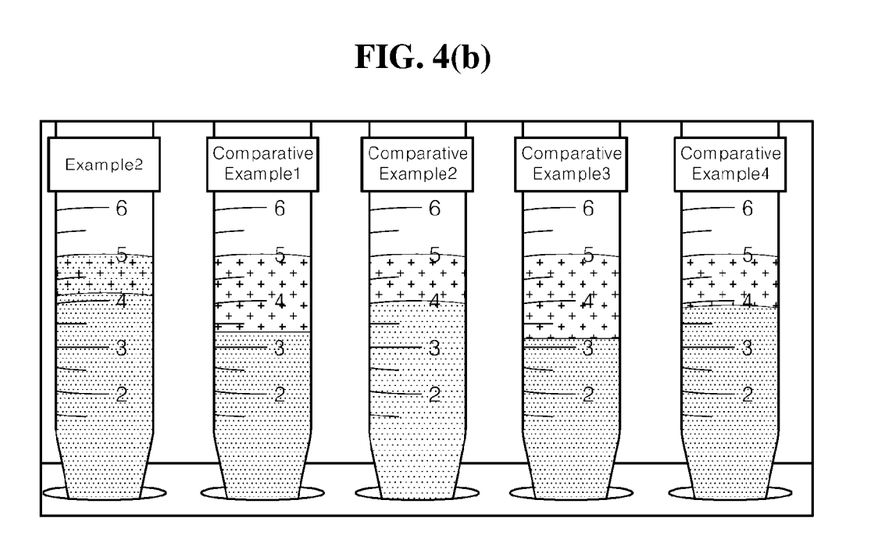

FIG. 4(a) is an initial image of each of the silicon slurries, and FIG. 4(b) is an image after leaving the same for 7 days. In FIG. 4(b), results of the height of the silicon slurry excluding the separated upper supernatant liquid layer are shown in Table 3, as measured and calculated by % relative to an initial height of the silicon slurry.

TABLE 3

|  | Example 2 | Comparative Example 1 | Comparative Example 2 | Comparative Example 3 | Comparative Example 4 |
|---|---|---|---|---|---|
| Ratio of height of silicon slurry excluding separated upper supernatant liquidlayer [%] | 88 | 75 | 82 | 75 | 83 |

From the results of FIGS. 3 and 4 and Table 3, it shows that the silicon slurry of Example 2 exhibited excellent long-term storage stability, as compared with those of Comparative Examples 1 to 4.

Experimental Example 3

Figure 5:
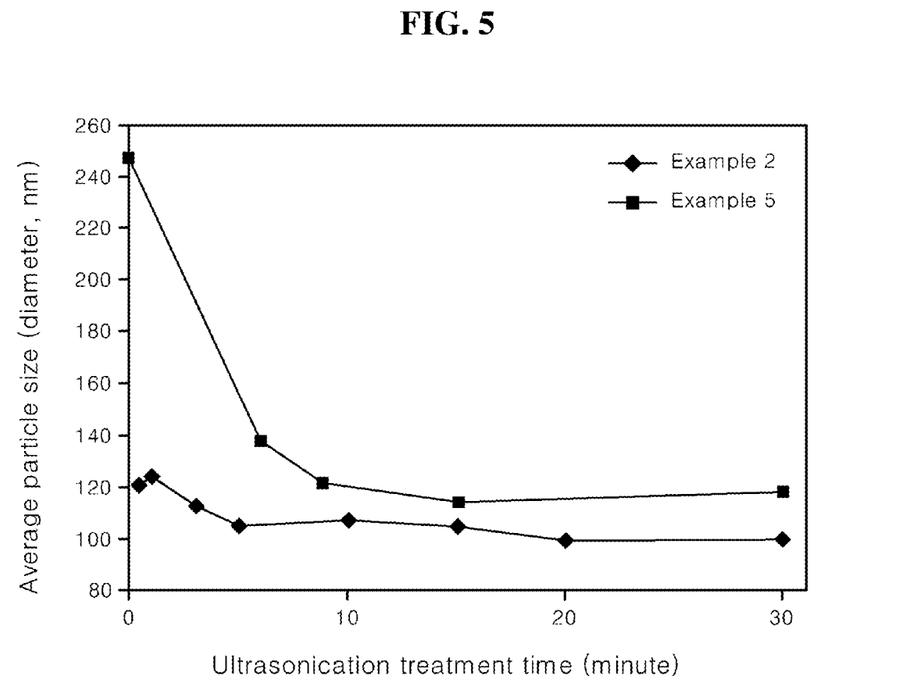
FIG. 5 is a graph showing changes in average particle size depending on ultrasonic treatment time during preparation of silicon slurries of Examples 2 and 5, according to some embodiments.

To compare ultrasonication efficiency in Examples 2 and 5, an average particle size depending on treatment time was measured by dynamic light scattering using an ELS-Z2 (Otsuka Electronics Co., Ltd.), and results are shown in the graph of FIG. 5.

After continuous circulation ultrasonication for 30 minutes, the silicon slurry of Example 2 exhibited dispersion characteristics of D50=76 nm and D90/D50=1.41.

Table 4 shows results of ultrasonication for the silicon slurry of Example 2, and Table 5 shows results of ultrasonication for the silicon slurry of Example 5.

TABLE 4

|  | Time (minutes) | | | | | | | |
|---|---|---|---|---|---|---|---|---|
|  | 0.5 | 1 | 3 | 5 | 10 | 15 | 20 | 30 |
| Average particle size [diameter, nm] | 121.5 | 124.1 | 113.0 | 105.2 | 107.3 | 104.6 | 99.3 | 99.7 |

TABLE 5

|  | Time (minutes) | | | | | |
|---|---|---|---|---|---|---|
|  | 0 | 6 | 9 | 15 | 30 | 45 |
| Average particle size [diameter, nm] | 246.7 | 138.0 | 121.2 | 114.6 | 117.7 | 119.8 |

From the results of FIG. 5 and Tables 4 and 5, it shows that continuous circulation ultrasonication provides better efficiency than batch type ultrasonication for the same dispersion characteristics.

Experimental Example 4

Using the silicon-carbon complex powder obtained in Example 7 as an anode active material, the anode active material, carboxymethyl cellulose (CMC) and styrene butadiene rubber (SBR) were mixed with water in a weight ratio of 96:2:2 (anode active material:CMC:SBR), thereby preparing a coating composition for forming an anode active material layer. The coating composition for forming an anode active material layer was coated onto a copper current collector, and dried in an oven at 110° C. for 20 minutes, followed by compression, thereby preparing an anode.

The prepared anode, separator, electrolyte [a mixed solvent of ethylene carbonate and dimethyl carbonate (weight ratio of 1:1), to which 1.0 M of LiPF$_6$ was added], and a lithium electrode were stacked in this order, thereby preparing a coin cell secondary battery.

Charge and discharge testing was performed on the secondary battery under the following conditions.

Charge and discharge conditions: Charge was performed using constant current at 0.2 C until 0.01 V and constant voltage at 0.01 V until 0.01 C, and discharge was performed using constant current at 0.2 C until 1.5 V.

The coating compositions for forming an anode active material layer including 3 wt % and 7 wt % of silicon were prepared by changing the amounts of the anode active material, CMC and SBR, and secondary batteries were prepared using the coating compositions including 3 wt % and 7 wt % of silicon, respectively. In addition, a separate secondary battery was prepared using a coating composition, which is free from silicon and prepared using pitch powder, i.e., a carbon material for the anode active material, (0 wt % of silicon, and 100 wt % of pitch). Increment of initial capacity of each of the secondary batteries including 3 wt % and 7 wt % of silicon was measured, as compared with initial capacity of the secondary battery free from silicon (0 wt % of silicon, 100 wt % of pitch). Results are shown in Table 6.

Meanwhile, the anode active materials used in the coating composition for forming an anode active material layer were prepared according to the following methods. Then, the coating compositions for forming an anode active material layer were prepared by simply mixing the prepared anode active materials, CMC and SBR in a weight ratio of 96:2:2, and secondary batteries A to C were prepared for comparative experiments in the same manner as the preparation method of the above secondary batteries. The anode active materials of the secondary batteries A to C were prepared by the following methods, respectively.

Preparation of Anode Active Material of Secondary Battery A

Si powder was subjected to ball milling to have an average particle diameter of 50 nm. Spherical graphite (SG) was prepared. Graphite-coated Si powder was prepared by mixing SG, Si and pitch in a weight ratio of 6:2:2, followed by heat treatment at 900° C. in a nitrogen atmosphere for 1 hour, thereby preparing a Si—C complex powder.

(2) Preparation of Anode Active Material of Secondary Battery B

After Si—C complex powder was prepared by mixing natural flake graphite (FG, average particle diameter of 200 μm, thin and flat overall shape) and Si in a weight ratio of 8:2, 5 wt % of pitch was mixed with the Si—C complex powder, followed by heat treatment at 900° C. in a nitrogen atmosphere for 1 hour.

(3) Preparation of Anode Active Material of Secondary Battery C

After mortar-mixing Si (50 nm, 98 wt %), natural graphite (~3 μm) and petroleum pitch powder (carbon yield: 26 wt %, 54 wt %) for 30 minutes, the mixture was charged into a planetary mill vial along with balls, followed by uniformly mixing the particles. After a first-stage of spheroidizing the mixture was performed by charging the mixture to a blade mill, followed by applying shear stress to the mixture through rotation of a rotor, a second-stage of spheroidzing the mixture was performed, thereby obtaining a spherical complex precursor having a form in which petroleum pitch, which is a carbon precursor, was coated onto the first-stage granulated particles. The spherical complex precursor was subjected to heat treatment at 1000° C. at a heating rate of 5° C./min in an Ar atmosphere for 5 hours to carbonize petroleum pitch, thereby preparing a Si/graphite/petroleum pitch.

For comparison, increment of initial capacity of each of the secondary batteries A to C was measured, as compared with initial capacity of the secondary battery free from silicon, and results are shown in Table 6.

For comparison with the secondary batteries including 3 wt % and 7 wt % of silicon, the silicon content of each of the secondary batteries A to C was measured, and results are shown in Table 6.

TABLE 6

| Item | Composition of anode active material (relative amount of pitch/silicon in 100 wt % of a sum of pitch and silicon, wt %) | Increment of initial capacity as compared with initial capacity of secondary battery free from silicon (mAh/g) |
|---|---|---|
| Secondary battery using anode active material of Example 7 | 97/3 | 119.4 |
| Secondary battery using anode active material of Example 7 | 93/7 | 228.4 |
| Secondary battery A for comparative experiments | 81/19 | 39 |
| Secondary battery B for comparative experiments | 80/20 | 111 |
| Secondary battery C for comparative experiments | 76.6/23.4 | 500 |

Figure 6:
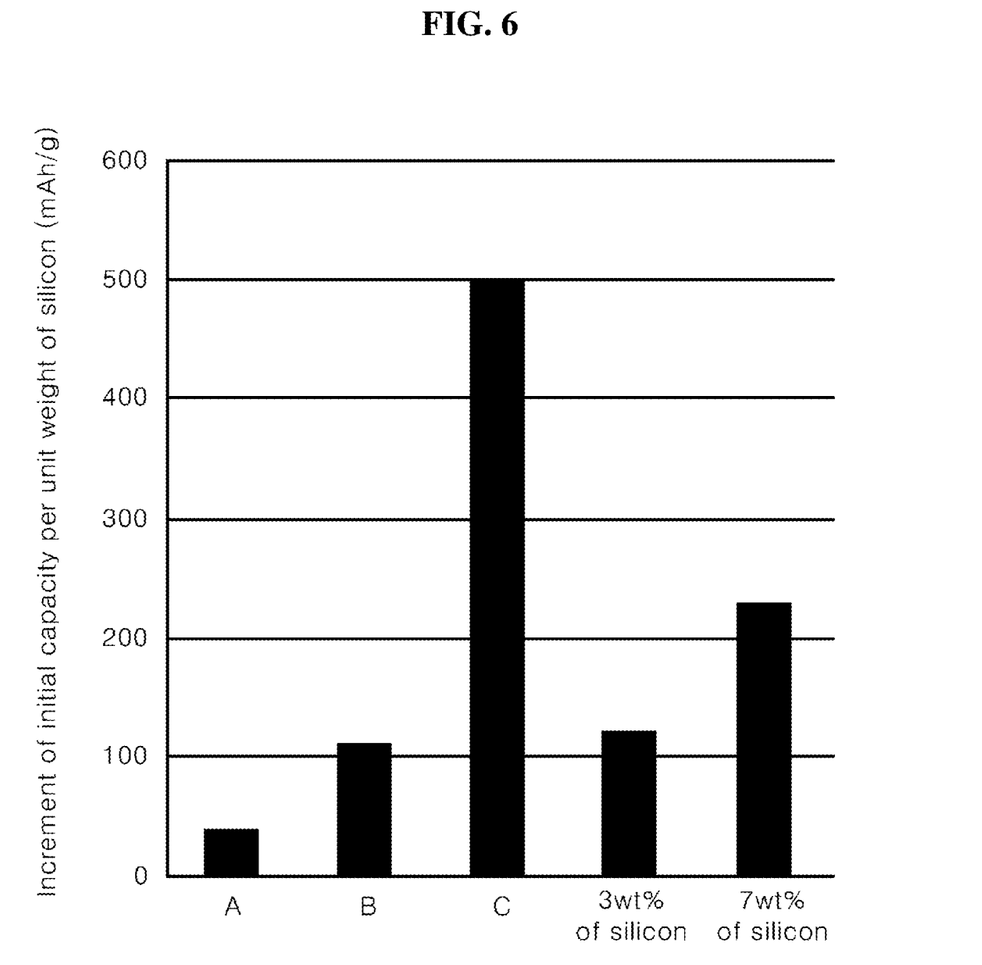
FIG. 6 is a graph showing capacities per unit weight of silicon of each secondary battery when the secondary batteries are respectively prepared using coating compositions for an anode active material prepared to include 3 wt % and 7 wt % of silicon using silicon slurry of Example 7, according to some embodiments.

FIG. 6 is a graph showing calculated capacities per unit weight of silicon in each of the secondary batteries of Table 6.

From the results of FIG. 6, it shows that each of the secondary batteries including 3 wt % and 7 wt % of silicon provides a capacity increment of about 100 mAh/g to about 200 mAh/g, and exhibits excellent increment of capacity per unit weight of silicon as compared with the secondary batteries A to C. That is, since silicon was used in a slurry form in which silicon particles are dispersed in a dispersion medium, silicon was prevented from oxidation.

Figure 7:
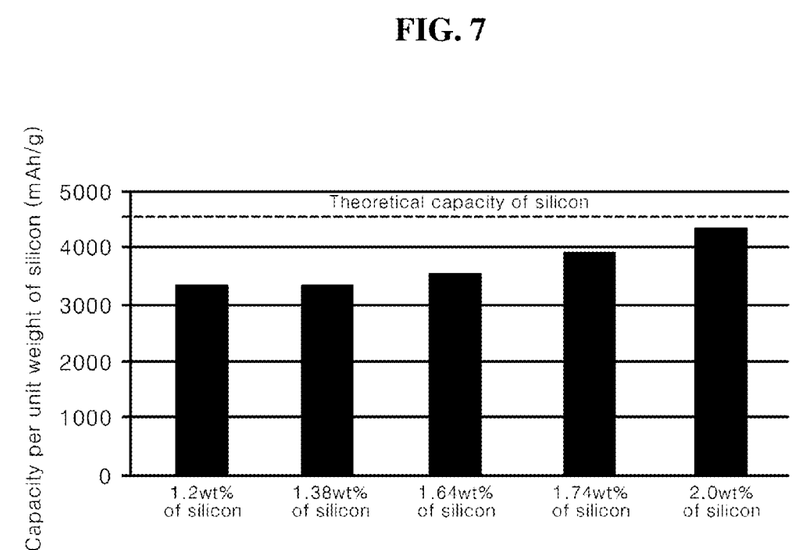
FIG. 7 is a graph showing capacities per unit weight of silicon in each secondary battery when the secondary batteries are respectively prepared using coating compositions for an anode active material prepared to include 1.64 wt %, 1.38 wt %, 1.2 wt %, 1.74 wt % and 2.0 wt % of silicon using silicon slurry of Example 7, according to some embodiments.

FIG. 7 is a graph showing capacities of each secondary battery per unit weight of silicon when the secondary batteries were prepared in the same manner as the aforementioned method except that coating compositions for forming an anode active material respectively included 1.2 wt %, 1.38 wt %, 1.64 wt %, 1.74 wt % and 2.0 wt % of silicon. In above cases, it shows that the secondary batteries exhibited excellent capacity per unit weight of silicon of 3000 mAh/g or more.

Experimental Example 5

A secondary battery was prepared in the same manner as in Experimental Example 4 except that the coating composition for forming an anode active material layer included 2 wt % of silicon and a secondary battery for comparison wherein the coating composition for forming an anode active material layer included 0 wt % of silicon was prepared in the same manner as in Experimental Example 4. Capacity depending on cycles was measured on each of the secondary batteries. Results are shown in a graph of FIG. 8.

Figure 8:
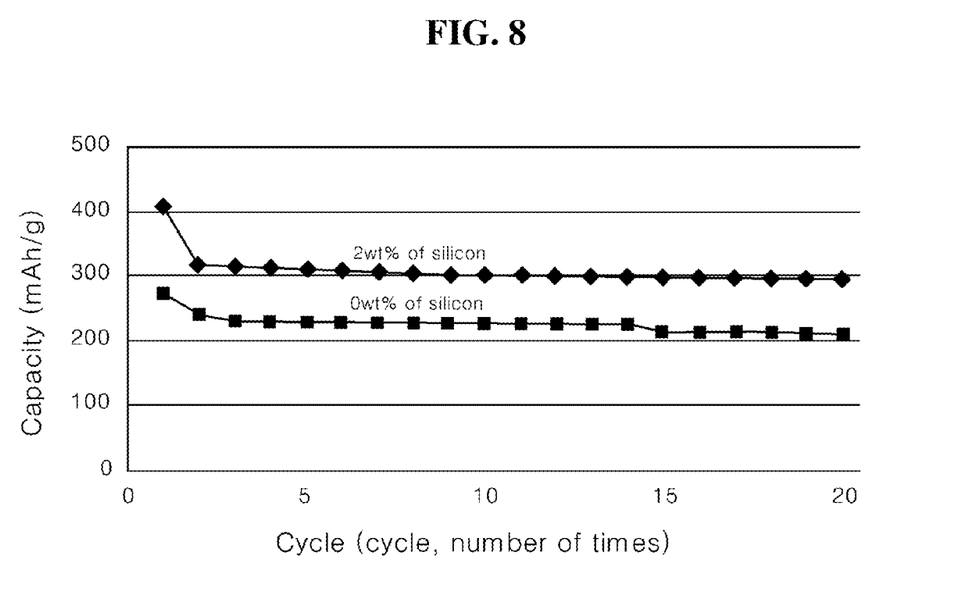
FIG. 8 is a graph showing capacities of secondary batteries depending upon cycles when the secondary battery is prepared using a coating composition for an anode active material prepared to include 2 wt % of silicon using silicon slurry of Example 7, according to some embodiments.

From FIG. 8, it shows that the secondary battery wherein the coating composition for forming an anode active material layer included 2 wt % of silicon maintained high capacity until 20 cycles, and thus had long lifespan.

Figure 9:
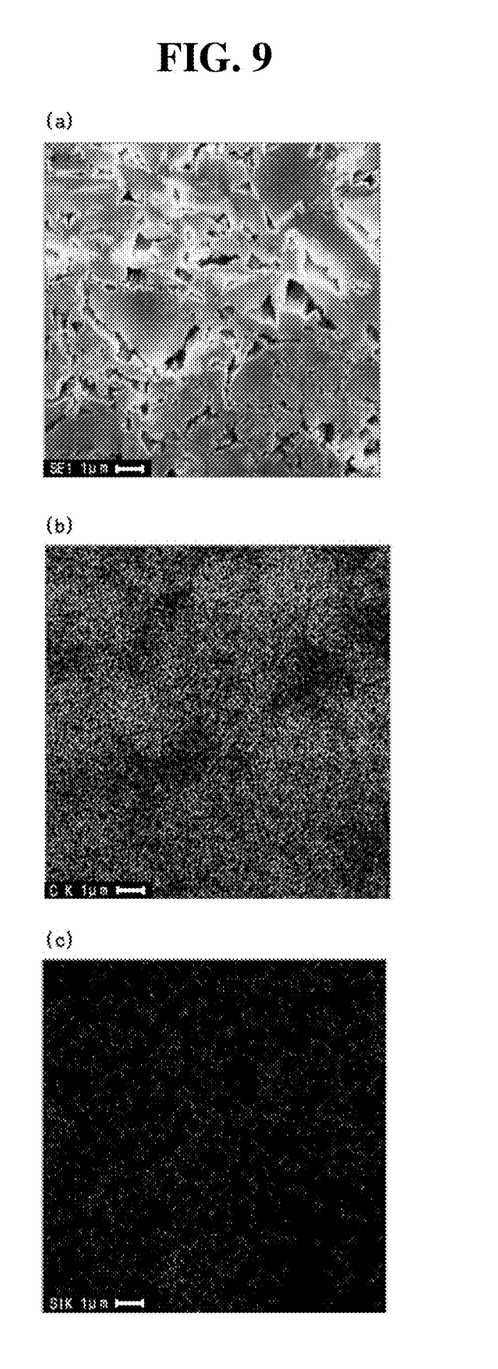
FIG. 9 is scanning electron microscope (SEM) images of an electrode, cut by a Focused Ion Beam (FIB), of a secondary battery after 20 cycles when the secondary battery is prepared using a coating composition for an anode active material prepared to include 2 wt % of silicon using silicon slurry of Example 7, according to some embodiments.

FIG. 9(a) is an SEM image of an electrode, cut using a focused ion beam (FIB), of the prepared secondary battery after 20 cycles of charge and discharge, and FIGS. 9(b) and 9(c) are EDX images thereof. Results analyzed by energy-dispersive X-ray spectroscopy (EDX) are shown in Table 7.

TABLE 7

| Element | wt % | At % |
|---|---|---|
| CK | 97.90 | 98.65 |
| SiK | 2.10 | 1.35 |

From FIG. 9(c), it shows that silicon was uniformly dispersed, and 2.1 wt % of silicon was measured by EDX analysis, which is the comparative amount with carbon (Since the coating composition for forming an anode active material layer included 2 wt % of silicon in preparation of the secondary battery, the content corresponding thereto was measured). In concluding the detailed description, those skilled in the art will appreciate that many variations and modifications can be made to the preferred embodiments without substantially departing from the principles of the some embodiments described above. Therefore, the described some embodiments are used in a generic and descriptive sense only and not for purposes of limitation.

What is claimed is:

1. Silicon slurry for anode active materials of secondary batteries, the silicon slurry comprising:
    silicon particles; and
    a dispersion medium,
    wherein the silicon particles are present in an amount of 10 wt % to 30 wt % of the silicon slurry, and
    wherein the silicon slurry satisfies dispersion conditions of 1≤D90/D50≤2.5 and 2 nm<D50<180 nm,
    where
    D90 denotes an average diameter of the silicon particles at 90% of cumulative particle size distribution, and
    D50 denotes an average diameter of the silicon particles at 50% of cumulative particle size distribution.

2. The silicon slurry according to claim 1, wherein the silicon slurry satisfies silicon particle distribution conditions of 1≤D90/D50≤2.0 and 2 nm<D50<160 nm.

3. The silicon slurry according to claim 1, wherein the silicon slurry satisfies silicon particle distribution conditions of 1≤D90/D50≤1.75 and 2 nm<D50<120 nm.

4. The silicon slurry according to claim 1, wherein the dispersion medium comprises at least one selected from the group consisting of N-methyl-2-pyrrolidone (NMP), tetrahydrofuran (THF), water, ethanol, methanol, cyclohexanol, cyclohexanone, methyl ethyl ketone, acetone, ethylene glycol, octyne, diethyl carbonate, and dimethyl sulfoxide (DMSO).

5. The silicon slurry according to claim 1, wherein the silicon slurry is subjected to ultrasonication.

6. The silicon slurry according to claim 5, wherein the ultrasonication is performed in a batch manner in which the silicon slurry is subjected to ultrasonication or in a continuous circulation manner in which part of the silicon slurry is continuously subjected to ultrasonication while circulating the silicon slurry.

7. The silicon slurry according to claim 1, further comprising:
    an additive comprising a block copolymer,
        wherein the block copolymer comprises a block having high affinity for Si and a block having low affinity for Si,
        wherein the block having high affinity for Si is at least one selected from the group consisting of polyacrylic acid, polyacrylate, polymethacrylic acid, polymethyl methacrylate, polyacryl amide, carboxymethyl cellulose, polyvinyl acetate, and polymaleic acid, and
        wherein the block having low affinity for Si is at least one selected from the group consisting of polystyrene, polyacrylonitrile, polyphenol, polyethylene glycol, polylauryl methacrylate, and polyvinyl difluoride.

8. The silicon slurry according to claim 7, wherein the additive is present in an amount of about 0.1 parts by weight to about 50 parts by weight based on 100 parts by weight of the silicon particles.

9. The silicon slurry according to claim 7, wherein the silicon particles and the block copolymer forms Si-block copolymer core-shell nanoparticles.

10. The silicon slurry according to claim 9, wherein the Si-block copolymer core-shell nanoparticles have a Si core, and a block polymer shell formed by the block copolymer.

11. The silicone slurry according to claim 7, wherein the block polymer of the nanoparticles is a polyacrylic acid-polystyrene block copolymer.

12. The silicone slurry according to claim 11, wherein the polyacrylic acid of the block polymer has a number average molecular weight ($M_n$) from about 100 g/mol to about 100,000 g/mol.

13. The silicone slurry according to claim 11, wherein the polystyrene of the block polymer has a number average molecular weight ($M_n$) from about 100 g/mol to about 100,000 g/mol.

14. A carbon-silicon complex prepared from a mixed composition in which carbon is mixed with the silicon slurry according to claim 1.

15. The carbon-silicon complex according to claim 14, wherein the carbon comprises at least one selected from the group consisting of pitch, natural graphite, artificial graphite, soft carbon, hard carbon, graphene, and carbon nanotubes.

16. The carbon-silicon complex according to claim 14, wherein the silicon slurry is present in an amount of about 0.5 parts by weight to about 30 parts by weight based on 100 parts by weight of the carbon.

17. The carbon-silicon complex according to claim 14, wherein the carbon-silicon complex is prepared by heat treatment of the mixed composition, followed by carbonization.

* * * * *